CIRCUIT FOR GENERATING TWO PULSES HAVING A CONTROLLED TIME-SPACED RELATIONSHIP TO EACH OTHER

Filed Nov. 13, 1967

INVENTOR.
Irwin Munt

BY

ATTORNEY

United States Patent Office 3,497,814

Patented Feb. 24, 1970

3,497,814

CIRCUIT FOR GENERATING TWO PULSES HAVING A CONTROLLED TIME-SPACED RELATIONSHIP TO EACH OTHER

Irwin Munt, Elizabeth, N.J., assignor to Weston Instruments, Inc., Newark, N.J., a corporation of Delaware Filed Nov. 13, 1967, Ser. No. 682,487
Int. Cl. H03k 1/00, 3/02
U.S. Cl. 328—62 4 Claims

ABSTRACT OF THE DISCLOSURE

A circuit is disclosed for converting an input signal transition into two output pulses having a controllable time separation therebetween. First and second signal differentiating circuits are connected in series via a first signal amplifying device which is operated essentially as an electronic switch by the pulse output of the first signal differentiating circuit. A second signal amplifying device, also operated essentially as an electronic switch, is coupled to receive the output of the second differentiating circuit. The input signal transition is converted into a first pulse having a waveform representative of the first time derivative of that signal transition and the first signal amplifying device converts the first pulse into a first output pulse having a leading and a trailing edge and a pulse width determined by the time constant of the first differentiating circuit. The first output pulse is converted by operation of the second differentiating circuit and the second signal amplifying device into a second output pulse having a leading edge which is spaced from the leading edge of the first output pulse by a time interval controlled by the time constant of the first differentiating circuit.

Figure 1:
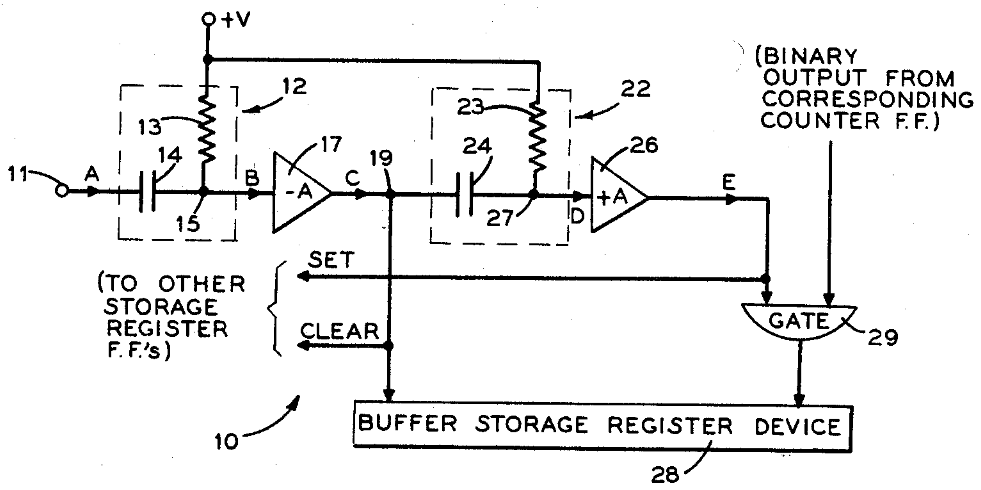

This invention relates to a circuit for deriving from an electrical input signal two pulses having a controlled time-spaced relationship and possessing sufficient electrical energy to satisfy large fan-out requirements that may be imposed upon the circuit.

Computing systems and certain types of electrical instruments, such as analog-to-digital converters and digital voltmeters, commonly employ a buffer storage unit or register to store information in digital form for prescribed periods of time. In such instruments, the buffer store is typically used in conjunction with an electronic counter to store in digital form the number of successive pulses which have been counted by the counter at, for example, the termination of a counting cycle. With the digital information from the counter in the buffer store, the next pulse counting operation may proceed while stored information is applied, generally via a suitable decoder, to an instrument readout device taking the form of, for instance, a gas tube display. At the termination of each counting cycle it becomes necessary to initially "clear" the buffer store and then "set" or condition it to receive the digital output of the counter representing the number of pulses received during the previous corresponding counting cycle.

Typically, the buffer store comprises a plurality of storage units equal in number to the number of stages of the counter which feeds digital information to the store. Each stage of the counter and its corresponding storage unit is usually formed by a flip-flop. The buffer unit flip-flops should have the capability of being cleared (or reset to only one of two possible binary states) by the application of a "clear" signal to one of the flip-flop terminals and then set to one of two possible states as determined by the binary state of its corresponding counter flip-flop. A flip-flop of the J–K or R–S type is often used in buffer storage units since it may be readily cleared by the application of a positive pulse to its reset terminal, and then set into one of two possible states by a digital signal received as an output signal from an associated counter flip-flop. In the interest of reducing the number of components used in the instrument, the pulses which are required to clear and then set the buffer store should preferably possess sufficient electrical energy in the form of voltage and/or current to effect the direct and immediate clearing and setting of all of the buffer store flip-flops. Moreover, in the interests of economy and ease of circuit fabrication or manufacture, it would be advantageous to have available as a circuit of the specified type, one that may be constructed with a minimum number of components with possibly some duplication of certain components in the circuit.

Circuits that are capable of generating two pulses in response to an input trigger signal are, in general, known to those working in the electrical arts. In their simplest form, such prior art circuits utilize a differentiating circuit in cascade with a monostable multivibrator. The design and arrangement of such circuits is well known to those working in the art and, accordingly it suffices to state that application of a step voltage to such a circuit would in the production of two time-spaced pulses. Typically, the first of such pulses would take the form of a spike pulse produced by the differentiating circuit in its response to a step voltage input and the second pulse would take the form of a rectangular pulse having a pulse width determined by the time constant of the monostable multivibrator.

One of the main disadvantages of timing circuits which utilize monostable multivibrators is that even in the most simple form, such circuits are relatively complex, principally because these circuits require, in addition to a relatively large number of components, feedback circuitry for providing the requisite amount of regenerative feedback for restoring the multivibrator to a pre-triggered state. Moreover, in prior art circuits of the specified type, there is usually no possibility for duplication of components, that is, for being able to use two or more of the same components in one circuit. The advantages realized from being able to duplicate components manifestly include lower inventory and fabrication costs.

It is an object of this invention to provide a circuit for producing two pulses with a controllable time separation which requires fewer components than known circuits of this type, and additionally, utilizes components which may be duplicated within the circuit.

For a better understanding of the present invention, together with other and further objects thereof, reference may be had to the following description taken in connection with the accompanying drawings, the scope of the invention being pointed out in the appended claims.

Referring to the drawings:

FIGURE 1 is a circuit diagram, shown partly in block schematic form, of one embodiment of the invention arranged to generate two time-spaced pulses from an input signal transition and FIGURES 2A to 2E, inclusive, show signal waveforms which appear at various points, having corresponding reference letters, in the circuit of FIGURE 1.

Figure 2:
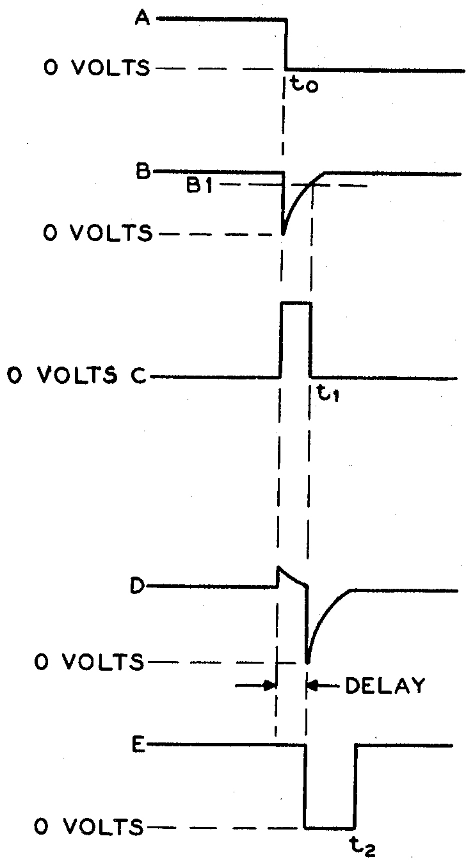

FIGURE 1 illustrates a circuit 10 constructed in accordance with the principles of this invention for converting an input signal transition and more specifically a negative-going step voltage, FIGURE 2A, which occurs at time $t_0$ into two time-spaced pulses which are depicted individually by FIGURES 2C and 2E.

As mentioned hereinabove, circuit 10 may be utilized for providing successive clear and set pulses to a multiple input buffer storage register embodied in an analog-to-digital conversion system such as disclosed, for instance, in co-pending U.S. patent application Ser. No. 661,924, filed Aug. 21, 1967, and entitled "Analog-to-Digital Converters." The latter application is assigned to the same assignee as the instant invention. Incorporated in this conversion system, the instant circuit may be utilized to effect the sequential clearing and setting of a buffer store, formed by a plurality of bistable multivibrators, in response to a negative-going voltage transition produced as a result of a ramp voltage crossing a specified datum level.

The input terminal 11 of the circuit 10 is connected to a conventional R-C differentiating circuit encompassed by broken lines, and designated generally by the numeral 12, the circuit 12 comprising a resistor 13 and a capacitor 14 connected in series. A junction 15 between the resistor 13 and capacitor 14 is connected to the input of an amplifier 17 having a high negative gain, whereas the ends of the capacitor 14 and resistor 13 remote from the junction 15 are connected respectively to the input terminal 11 and a source of positive potential +V. Under quiescent conditions the potential +V applied to the resistor 13 is sufficient to maintain the amplifier 17 in a saturated condition such that its output potential is clamped substantially at zero volts.

The amplifier 17 has a small input-signal threshold level such that if the voltage appearing at its input terminal falls by a small amount its high negative gain causes it to switch from a saturated to a nonconductive condition. It acts therefore virtually as an electronic switch to input voltages which drop below the threshold level, or alternatively, which rise to that threshold level from a more negative potential level. This threshold level is depicted by the broken line $B_1$ in FIGURE 2B and is typically slightly less positive than the positive potential of the constant potential source +V.

The output from the amplifier 17 is coupled to a second R-C differentiating circuit, encompassed by broken lines and designated by the numeral 22; the circuit 22 comprising a resistor 23 and a capacitor 24 connected in series. A junction 27 between the resistor 23 and the capacitor 24 is connected to an amplifier 26 having a high positive gain, and the ends of the resistor 23 and capacitor 24 remote from the junction are connected to the source +V and the output of amplifier 17 respectively. The output from the amplifier 17 is also connected to the CLEAR terminal of each bistable circuit of the buffer storage register, one stage 28 of which is shown in the figure.

To minimize the cost of manufacturing the circuit 10 the differentiation circuit 22 may be fabricated as a virtual duplicate of the circuit 12, with the result that the difference between each rectangular pulse-forming part of the circuit 10 resides solely in the type of amplifiers 17 and 26. Moreover, and as will be apparent to those working in the art of integrated circuits, the components forming the circuit 10 may be easily and readily reduced to integrated or monolithic circuit form.

The amplifier 26, like that of the amplifier 17, has a threshold triggering level which is between ground potential and a more positive potential level. Under quiescent conditions, the potential derived from the source +V and applied to the amplifier input via the resistor 23 is more positive than the threshold triggering level of the amplifier 26. Because the amplifier 26 has positive gain under quiescent conditions, the output potential of this amplifier is maintained at a virtually constant positive level relative to ground potential, as illustrated in FIGURE 2E. In a manner similar to that described hereinabove in relation to the amplifier 17, the application to the amplifier 26 of a triggering pulse from the circuit 22 having a negative-going leading edge which crosses the threshold level of the amplifier 26 and drives the amplifier from a state of high or full conduction into a state of low or nonconduction. The amplifier 26 is driven back into a state of full conduction when the trailing edge of the triggering pulse gain crosses the amplifier threshold level.

The output from the amplifier 26 is connected to one input terminal of a gate 29, which typically takes the form of an AND gate, the other input terminal of the amplifier 26 being connected to a bistable multivibrator in the instrument counter. The output from the gate 29 is connected to the SET input terminal of the corresponding bistable circuit in the buffer store.

In operation, the generation of the clear and set pulses is initiated by applying at time $t_0$ the negative-going input voltage transition of FIGURE 2A through the terminal 11 to the differentiating circuit 12, the first time derivative output of which is in the form of the spike pulse of FIGURE 2B and has a fast negative-going leading edge and an exponentially decaying trailing edge as shown.

As the negative-going edge of the spike waveform of FIGURE 2B passes through the amplifier threshold level $B_1$ it causes the voltage at the output of the amplifier 17 to switch abruptly from zero volts to a positive voltage level. Similarly, the positive-going edge of the spike waveform causes the amplifier output level to return, at time $t_1$, to its quiescent state of zero volts. The output signal of amplifier 17 is therefore a rectangular pulse starting at time $t_0$ and having a pulse length $(t_1-t_0)$ dependent upon the time constant of the differentiating circuit 12. The pulse length of this rectangular pulse may be varied by adjusting the values of either or both of the constituent components of the circuit 12 and when used as a clear pulse for a buffer store would typically be on the order of 500 microseconds, this time interval being normally sufficient to permit stabilization of the associated counter.

The output waveform FIGURE 2C of amplifier 17 is applied to the second differentiating circuit 22, to provide a second differential waveform, shown in FIGURE 2D.

The negative-going edge of the waveform of FIGURE 2D causes the output level of amplifier 26 to switch in a manner similar to that described with reference to amplifier 17, to provide a rectangular pulse starting at time $t_1$, as shown in FIGURE 2E, and having a pulse length equal to a time interval $(t_2-t_1)$. The pulse length $(t_2-t_1)$ may be determined by the time constant of the differentiating circuit 22 in a manner similar to that described with reference to the operation of amplifier 17 and also may be on the order of 500 microseconds.

The output pulse from amplifier 26 enables the gate 29 during the period from $t_1$ to $t_2$ so as to allow the binary output signal from the counter bistable to "set" the corresponding bistable circuit in the buffer store to the same binary state as its corresponding counter bistable.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A circuit for converting an input signal transition into two time-spaced pulses, the circuit comprising, first differentiating means for receiving and converting the input signal transition into a first pulse having a waveform representative of the first time derivative of the input signal transition, first means coupled to said first differentiating means for generating in response to said first pulse a first output pulse having leading and trailing edges and a pulse width determined by the time constant of said first differentiating means, second differentiating means coupled to the first pulse generating means for receiving and converting the first output pulse into a second pulse having a waveform representative of the first time derivative of the trailing edge of said first output pulse, second means coupled to the second differentiating means for generating in response to the second pulse a second output pulse having a leading edge which is time-spaced from the leading edge of said first output pulse by a time interval determined by the time constant of said first differentiating means.

2. The circuit as claimed in claim 1, wherein an input signal transition is a negative-going step voltage and, wherein the first generating means comprises an A.C. amplifier having a high negative voltage gain.

3. The circuit as claimed in claim 1, wherein an input signal transition is a negative-going step voltage and, wherein the second generating means comprises an A.C. amplifier having a high positive voltage gain.

4. A circuit for converting an input electrical signal transition into two time-spaced pulses comprising first and second series-connected signal differentiating circuits, the first differentiating circuit receiving and transforming the input signal transition into a first pulse having a waveform representative of the first time derivative of the input signal transition, signal amplifying and inverting means coupled to said first differentiating circuit for receiving the first pulse produced by said first circuit and generating in response to said first pulse a first output pulse having leading and trailing edges and a pulse width determined by the time constant of said first circuit, the second differentiating circuit coupled to receive the output of said signal inverting means for transforming said first output pulse into a second pulse having a waveform representative of the first time derivative of the trailing edge of the first output pulse, and signal amplifying means coupled to receive the output of said second differentiating circuit for generating a second output pulse in response to said second pulse, said second output pulse having a leading edge spaced from the leading edge of said first output pulse by a time interval determined by the time constant of said first differentiating circuit.

References Cited

UNITED STATES PATENTS

| | | | |
|---|---|---|---|
| 2,313,906 | 3/1943 | Wendt | 328—55 X |
| 2,910,583 | 10/1959 | Toner | 328—55 |
| 3,202,919 | 8/1965 | Kitz et al. | 307—268 X |
| 3,422,287 | 1/1969 | Townsend | 307—268 X |

OTHER REFERENCES

Pub. I: "Square Wave Delay Circuit" in RCA Technical Notes, RCA TN No. 490, September 1961, 2 pages (unnumbered).

DONALD D. FORRER, Primary Examiner

S. D. MILLER, Assistant Examiner

U.S. Cl. X.R.

307—229, 260, 262, 265, 268; 328—55, 127